Feb. 17, 1925.
R. HEYDRICH Y MARTINEZ
1,527,057
COCK AND FAUCET AND SIMILAR DEVICE
Filed March 7, 1924
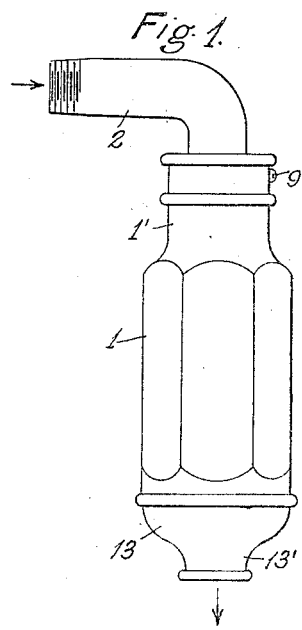
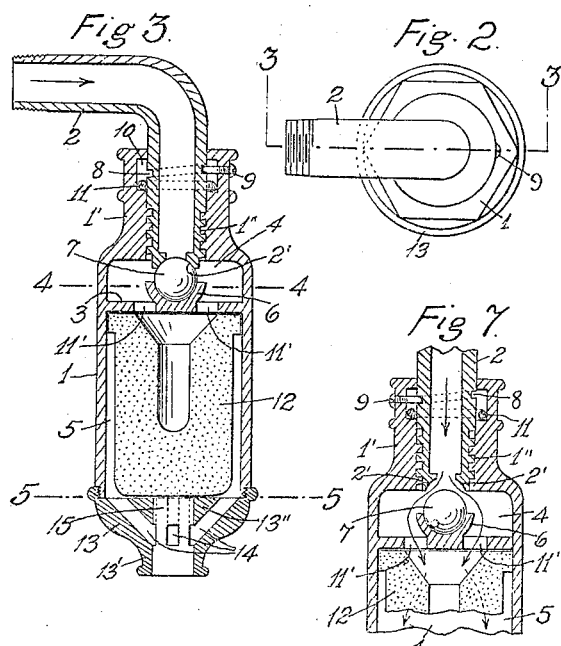
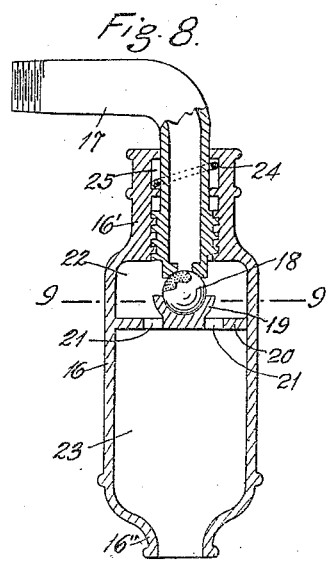
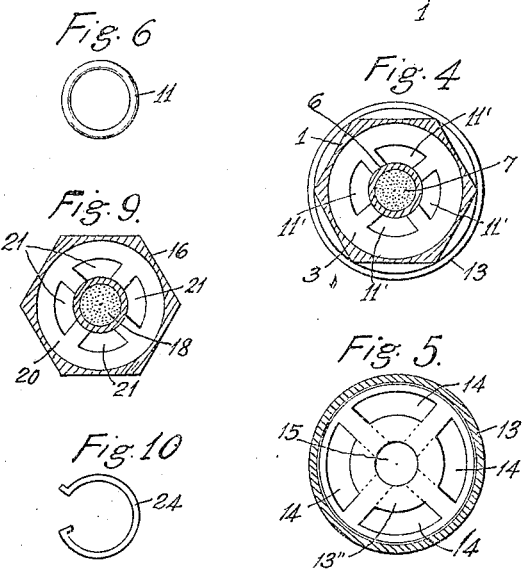
INVENTOR.
R. HEYDRICH Y MARTINEZ.
BY
Langner, Parry, Card & Langner
ATTORNEYS.

Patented Feb. 17, 1925.

1,527,057

UNITED STATES PATENT OFFICE.

ROBERTO HEYDRICH Y MARTINEZ, OF HABANA, CUBA.

COCK AND FAUCET AND SIMILAR DEVICE.

Application filed March 7, 1924. Serial No. 697,601.

*To all whom it may concern:*

Be it known that I, ROBERTO HEYDRICH Y MARTINEZ, citizen of the Republic of Cuba, residing at Habana, Cuba, have invented certain new and useful Improvements in Cocks and Faucets and Similar Devices, of which the following is a specification.

This invention refers to cocks or faucets and similar devices, and has for its main object, to provide an improvement in the structure of cocks and faucets, by means of which is obtained the elimination of a great number of the usual parts that are employed in devices of this kind, thereby reducing the cost of manufacture.

It is a further object of this invention, to provide an improved cock or faucet in combination with a filtering element, which said combination offers the advantage that the faucet and filter constitute an apparatus in which said cock or faucet can be utilized alone or together with the filter, as desired.

Reference is to be had to the accompanying drawings, forming a part of this application, in which similar characters of reference indicate corresponding parts in all the figures, and wherein, Fig. 1 is a side elevation of the cock or faucet, the object of the invention.

Fig. 2 is a plan view of the device.

Fig. 3 is a section on line 3—3 of Fig. 2.

Fig. 4 is a horizontal section, on line 4—4 of Fig. 3.

Fig. 5 is a horizontal section, on line 5—5 of Fig. 3.

Fig. 6 is a detailed view of an attachment.

Fig. 7 is a fragmentary section on line 3—3 of Fig. 2, showing an operative position of the device.

Fig. 8 is a vertical diametrical section of a modified form of the invention.

Fig. 9 is a horizontal section on line 9—9 of Fig. 8.

Fig. 10 is a detailed view of an attachment for the modified form shown in Fig. 9.

As is shown in Figures 1 to 5, inclusive, the cock or faucet, consists of a main hollow body 1 of polygonal shape with an opening at each end, and has at the top a neck 1' with an inner screw thread 1'' of steep pitch, which receives a tubular union 2, the end of which projects slightly into the main body 1 and carries an annular seat 2'. The main body 1, is interiorly divided into two sections 4 and 5 by a diaphragm 3, and in the upper face of the diaphragm 3, a semi-spherical seat 6 is provided, in which a spherical valve 7, made of rubber or similar material, is loosely seated.

In the space comprised between the threaded extension 1'' and the upper flange of the neck 1', a helical groove 8 is provided equal to one quarter of a turn of the main body 1 on the branch 2, and in said groove is received the point of a screw 9, carried by 1' and which limits the forward or rearward movement of the main body 1. Within a socket 10 in the neck 1', formed between its upper face and the threaded extension 1'' a rubber ring element 11, shown in detail in Figure 6, is frictionally housed.

The diaphragm 3 has ports 11' to permit the passage of the liquid from the upper section 4 to the lower section 5, which latter houses receptacle 12 made of porous filtering material, and bears on a closing cap 13 ending in a nozzle 13', which is threaded to the lower portion of the main body 1. The cap 13, has an integral bearing surface 13'' with radial ports 14 and a central port 15, leading to the nozzle 13', to permit passage of liquid filtered through the wall and the bottom of the receptacle 12, to the nozzle 13'.

It will be readily understood that in order to produce discharge of liquid, the pipe 2 being connected to a supply of liquid, all that is necessary is to give the body 1, a quarter of a twist, which is limited in its forward movement, by screw 9 in groove 8, whereby the valve 7, which is shown in a closed position in Fig. 3 takes the position illustrated in Fig. 7. This permits liquid to flow in the direction indicated by the arrows in Figure 7, the liquid passing through the ports 11' in the diaphragm 3, into the receptacle 12, through the same, and into the neck 13' of the cap 13 by means of bores 14 and 15.

A reverse movement of body 1, will return the parts to the position shown in Fig. 3, with the valve 7 closing the pipe 2.

Figs. 8, 9 and 10, illustrate a modified form of the invention, wherein the cock or faucet, is shown constituted by a main hollow body 16, having a top neck 16', and a lower nozzle 16'', and which likewise receives a pipe 17, the discharge end of which can be closed by a spherical obturator 18 carried loosely by a semi-spherical support 19 on a diaphragm 20, which diaphragm is provided with ports 21. This diaphragm divides the main body into two sections 22 and 23. A spring 24, detailed in Fig. 10, is placed in a space 25 formed between the threaded extension of the neck 16' and its upper face, and tends to screw body 16 and pipe 17 together. The lower part of body 16 can be formed as in Fig. 3 and a filter be received in section 23, but this is not shown on the drawing for the sake of clearness.

The operation in this case is exactly the same as in the other case, except that once the hand be withdrawn following the twisting movement of the main body 16, to open the faucet, the parts will return to their original closed position, due to the tension of the spring 24.

Having now described my invention, what I claim is—

1. A faucet comprising, a casing having an inlet and an outlet end, a perforated diaphragm dividing the casing into two compartments, an inlet pipe screwed into the inlet end of the casing, a valve seat on the inner end of the pipe, a semi-spherical socket on the diaphragm, a spherical valve in the socket and seatable on the valve seat, a helical blind ended groove in the pipe, a stud fixed to the casing and slidable in the groove, and a cushion ring positioned around the end of the pipe within the casing, a hollow, cup-like filter positioned between the diaphragm and the outlet end of the casing, the cup opening surrounding the diaphragm perforations, an annular space being left between the filter and the casing wall, an outlet nozzle in the casing, and central and side ports in the nozzle to receive respectively, flow through the bottom and through the side, of the filter.

2. A faucet comprising, a casing having an inlet and an outlet end, a perforated diaphragm dividing the casing into two compartments, an inlet pipe screwed into the inlet end of the casing, a valve seat on the inner end of the pipe, a semi-spherical socket on the diaphragm, a spherical valve in the socket and seatable on the valve seat, a hollow cup-like filter positioned between the diaphragm and the outlet end of the casing, the cup opening surrounding the diaphragm perforations, an annular space being left between the filter and the casing wall, an outlet nozzle in the casing, and central and side ports in the nozzle to receive respectively, flow through the bottom and through the side, of the filter.

In testimony whereof I have signed my name to this specification.

ROBERTO HEYDRICH y MARTINEZ.